US008950561B2

(12) United States Patent
Lister et al.

(10) Patent No.: US 8,950,561 B2
(45) Date of Patent: Feb. 10, 2015

(54) CLUTCH ASSEMBLY

(71) Applicant: Caterpillar Inc., Peoria, IL (US)

(72) Inventors: Brian E. Lister, Edwards, IL (US); Gaurav Vasudeva, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/302,702

(22) Filed: Jun. 12, 2014

(65) Prior Publication Data

US 2014/0291103 A1    Oct. 2, 2014

(51) Int. Cl.
  *F16D 25/061*     (2006.01)
  *F16D 25/0638*    (2006.01)
  *F16D 25/12*      (2006.01)
  *F16D 13/54*      (2006.01)

(52) U.S. Cl.
  CPC ..................... *F16D 13/54* (2013.01)
  USPC ................... 192/48.3; 192/48.619; 192/53.32

(58) Field of Classification Search
  CPC ......... F16D 13/42; F16D 21/08; F16D 13/70; F16D 25/10
  USPC .............. 192/48.3, 48.619, 53.1, 53.3, 53.32, 192/70.16
  See application file for complete search history.

(56) References Cited

U.S. PATENT DOCUMENTS

| 3,048,247 | A | * | 8/1962 | Cook et al. ................. 192/53.32 |
| 3,599,511 | A |   | 8/1971 | Storer |
| 4,553,655 | A |   | 11/1985 | Lech, Jr. et al. |
| 4,645,049 | A | * | 2/1987 | Matsuda et al. ................. 192/35 |
| 6,464,061 | B1 |  | 10/2002 | Inoue et al. |

FOREIGN PATENT DOCUMENTS

| GB | 355847 | * | 9/1931 |
| GB | 355847 A |   | 9/1931 |

* cited by examiner

*Primary Examiner* — Rodney H Bonck
*Assistant Examiner* — Stacey Fluhart
(74) *Attorney, Agent, or Firm* — William R. Tinker

(57) ABSTRACT

A clutch assembly is provided. The clutch assembly includes a basket member, an input member and an actuator that is disposed within the basket member. A hub member, having a hub spline and an inclined portion is disposed adjacent to the actuator. A cam member, having a cam spline and cam lobes is rotatably disposed on the input member. A shaft member, having a shaft spline and plurality of slots is rotatably disposed on the input member. The hub spline is engaged with the cam spline in a disengaged position of the actuator. The clutch assembly further includes a plurality of balls received within the corresponding slots of the shaft member. While moving towards an engaged position of the actuator, the cam spline aligns with the shaft spline thereby the hub spline engages with the shaft spline in the engaged position of the actuator.

1 Claim, 5 Drawing Sheets

US 8,950,561 B2

CLUTCH ASSEMBLY

TECHNICAL FIELD

The present disclosure relates to a clutch assembly.

BACKGROUND

A multidisc clutch assembly typically includes a first set of clutch plates coupled with a drive member and a second set of friction plates coupled with a driven member. The drive member may be coupled with an engine and the driven member may be coupled with a transmission system. In a disengaged condition of the clutch assembly, the clutch plates and the friction plates rotate independently of each other. However, the first and second clutch plates may tend to stick to one another or remain at least partially in contact with each other, even when the clutch assembly is disengaged. This may result in drag and/or spin losses within the multidisc clutch assembly. The drag and/or spin loss may lead to a reduction in an efficiency of the transmission system.

U.S. Pat. No. 3,599,511 discloses a power transmission. The power transmission includes an input and an output. A hydrodynamic torque converter having a pump is operatively connected to the input. The hydrodynamic torque converter includes first and second turbines. A power transmitting means is operatively connected to the output. The first gear set means is operatively connected to the first turbine and second gear set means is drivingly connected to second turbine and the power-transmitting means. A clutch means is operatively disposed between the first gear set means and the power-transmitting means for connecting and disconnecting the first turbine and the power-transmitting means. An actuator means is provided for effecting the engagement and disengagement of the clutch means. The actuator means includes first and second cam means relatively rotatable between a first relative position. The first and second cam means are drivingly connected to effect the full torque-transmitting engagement of the clutch means and a second relative position in which the first and second cam means permit the disengagement of the clutch means. A tickle spring means is operatively connected to the first and second cam means to relatively rotate the first and second cam towards the first relative position to effect an initial slipping engagement of the clutch means by the first cam means. Thus, the first gear set means subsequently relatively rotates the first and second cam means to the first relative position to cause the full torque-transmitting engagement of the clutch means. Thus, the torque developed by the first turbine is fully transmitted to the power transmission means.

SUMMARY OF THE DISCLOSURE

In one aspect of the present disclosure, a clutch assembly is provided. The clutch assembly includes an input member extending along a rotation axis. A basket member is rotatable about the rotation axis and spaced apart from the input member. A connecting member connects the input member and the basket member. A plurality of first clutch plates is slidably disposed on the basket member. An actuator is disposed adjacent to the connecting member in a disengaged position of the actuator. The actuator is movable along the rotation axis between the disengaged position and an engaged position thereof. A hub member is disposed adjacent to the actuator. The hub member is configured with the actuator to move along the rotation axis to the engaged position. The hub member includes a hub spline and an inclined portion. A spring member is configured to bias the hub member and the actuator in the disengaged position. A plurality of second clutch plates is slidably disposed on the hub member. Each of the plurality of second clutch plates is disengaged from the first clutch plates when the actuator is in the disengaged position. Further, each of the plurality of second clutch plates is engaged with the adjoining first clutch plates when the actuator is moved to the engaged position. A cam member is rotatably disposed on the input member. The cam member includes a cam spline and a plurality of cam lobes. The cam spline and the hub spline are engaged in the disengaged position of the actuator. The clutch assembly further includes a shaft member that extends along the rotation axis. The shaft member includes a shaft spline and a plurality of slots. The shaft member is rotatably disposed on the input member. The shaft spline is misaligned with the cam spline in the disengaged position of the actuator. Further, the shaft member is rotatable about the rotation axis relative to the cam member when the shaft spline and the cam spline are misaligned. The clutch assembly further includes a plurality of balls at least partly received within the corresponding slots of the shaft member. In the disengaged position of the actuator, the balls are retained at least partly within the corresponding slot by the inclined portion of the hub member against a centrifugal force. Further, the hub member is configured to move the plurality of balls to engage with the corresponding cam lobes due to movement along the rotation axis. The plurality of balls rotates the cam member in order to align the cam spline with the shaft spline. The hub member is slidable relative to the cam member and the shaft member when the cam spline is aligned with the shaft spline.

Other features and aspects of this disclosure will be apparent from the following description and the accompanying drawings.

DETAILED DESCRIPTION

Figure 1:
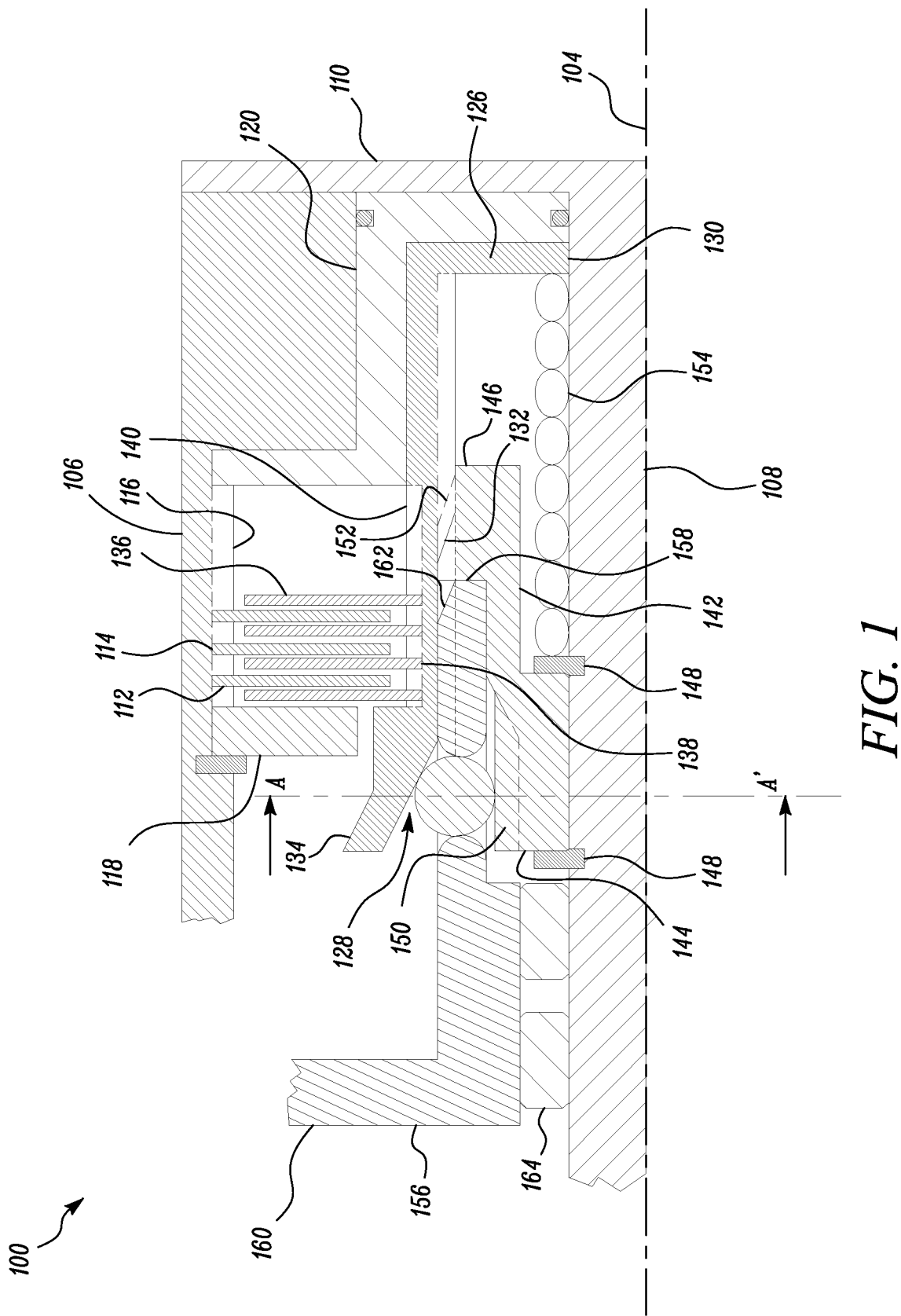
FIG. 1 is a partial sectional view of a clutch assembly, according to an embodiment of the present disclosure, in a disengaged condition thereof.

FIG. 1 shows a partial sectional view of a clutch assembly 100 according to an embodiment of the present disclosure. The clutch assembly 100 may be used with a powershift transmission system of an on-highway or an off-highway vehicle. The clutch assembly 100 may be disposed between a power source (not shown) and a transmission system (not shown) of a vehicle to transmit or disconnect a power between the power source and ground engaging elements such as, wheels or tracks of the vehicle. The power source may be an internal combustion engine.

The clutch assembly 100 includes an input member 108 that extends along a rotation axis 104 of the clutch assembly 100. The input member 108 may be drivably coupled with the power source of the vehicle. A basket member 106 is rotatable about the rotation axis 104 and spaced apart from the input member 108. The basket member 106 may be connected on the input member 108 via a connecting member 110. In the embodiment of FIG. 1, the connecting member 110 may be an integral part of the input member 108. The basket member 106 may be mounted on the connecting member 110 by, for example, welding or bolt and nut arrangement. However, in another embodiment, the connecting member 110 may be an integral part of the basket member 106. The connecting member 110 then may be mounted on the input member 108 by, for example, welding or bolt and nut arrangement. The basket member 106, the input member 108 and the connecting member 110 may be together adapted to accommodate various other components of the clutch assembly 100. The various components are described in detail hereinafter.

The clutch assembly 100 further includes a plurality of first clutch plates 112. The plurality of first clutch plates 112 may define an outer circumference 114. The plurality of first clutch plates 112 is slidably engaged with a spline 116 provided on inner surface of the basket member 106. Further, a stopping member 118 may restrict axial movement of the first clutch plates 112 in an engaged condition of the clutch assembly (shown in FIG. 5). The outer circumference 114 of the first clutch plates 112 may be provided with splines (not shown) slidably engaging with the spline 116 of the basket member 106.

An actuator 120 is disposed adjacent to the connecting member 110 in a disengaged position of the actuator 120. The clutch assembly 100 further includes a hub member 126 disposed adjacent to the actuator 120. The hub member 126 includes a first end 128 and a second end 130. The second end 130 of the hub member 126 is enclosed by the actuator 120 to move along the rotation axis 104 between the disengaged position and an engaged position of the actuator 120. Further, the hub member 126 may be rotatably disposed on the input member 108. The hub member 126 includes a hub spline 132 and an inclined portion 134. The hub spline 132 may be provided adjacent to the second end 130 at inner surface of the hub member 126. The inclined portion 134 may be provided at the first end 128 of the hub member 126. The inclined portion 134 extends radially away from the first end 128 of the hub member 126.

Figure 3:
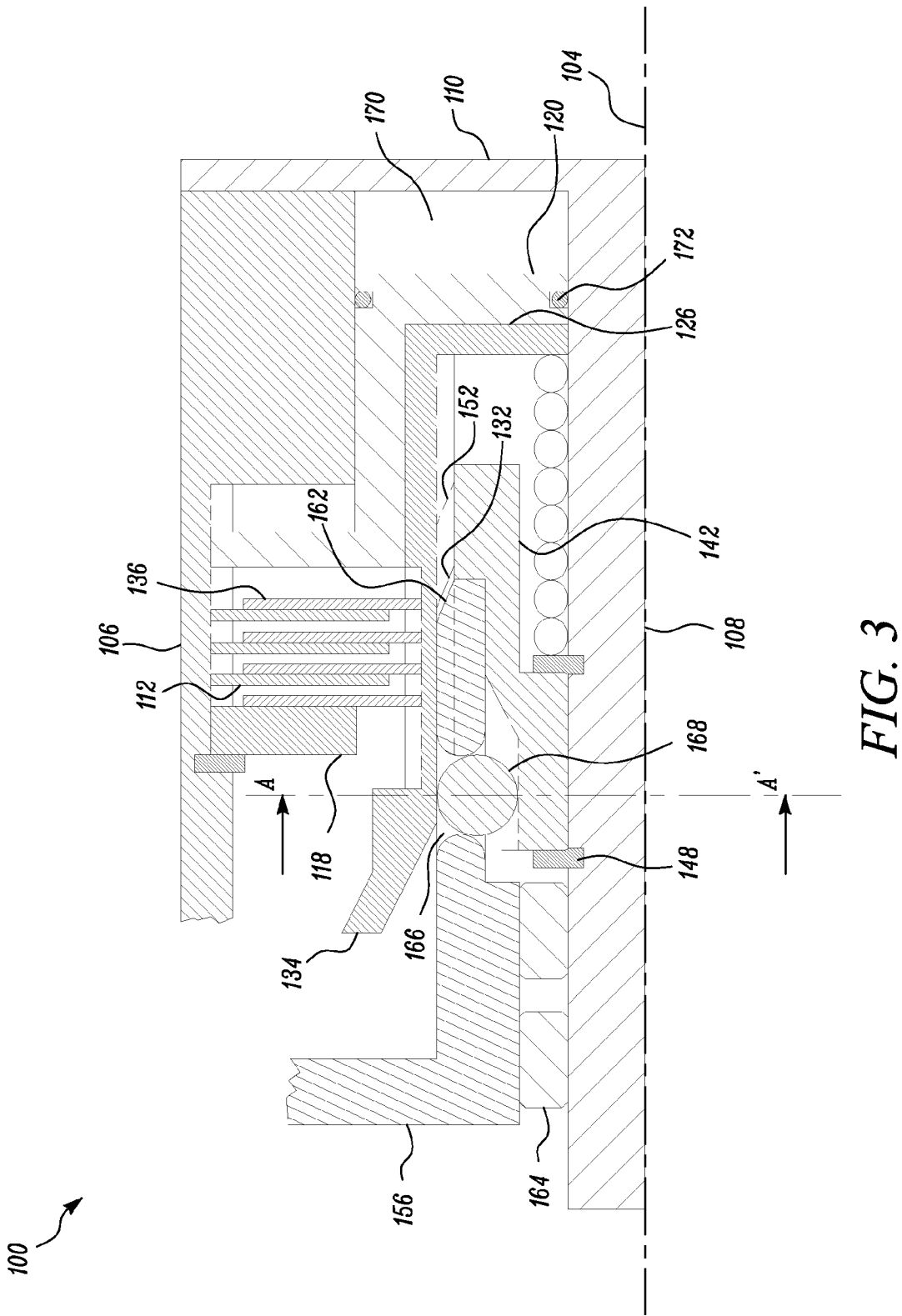
FIG. 3 is a partial sectional view of the clutch assembly of FIG. 1 in partially engaged condition thereof.

A plurality of second clutch plates 136 is slidably disposed on the hub member 126. The plurality of second clutch plates 136 may define an inner circumference 138. The inner circumference 138 of the second clutch plates 136 may be provided with splines (not shown) to slidably engage with corresponding splines 140 provided at outer surface of the hub member 126. Each of the second clutch plates 136 may be disposed on the hub member 126 such that each of the first and second clutch plates 112, 136 may be alternatively disposed adjacent to each other. For example, the first clutch plate 112 may be disposed between two second clutch plates 136 and vice versa. As such, when the actuator 120 is in the disengaged position, each of the plurality of second clutch plates 136 is disengaged from the first clutch plates 112. Further, as shown in FIG. 3, when the actuator 120 moves to the engaged position, each of the second clutch plates 136 is engaged with the adjoining first clutch plates 112 against the stopping member 118.

A cam member 142 is rotatably disposed on the input member 108. The cam member 142 includes a first end 144 and a second end 146. The cam member 142 may be further retained axially on the input member 108 via a retainer 148. A cam spline 152 is provided on outer surface adjacent to the second end 146 of the cam member 142. The cam spline 152 is configured to be engaged with the hub spline 132. A spring member 154 is disposed between the cam member 142 and the hub member 126. The spring member 154 is configured to bias the hub member 126, and hence the actuator 120 in the disengaged position thereof. The cam member 142 includes a plurality of cam lobes 150 provided on outer surface thereof adjacent to the first end 144.

The clutch assembly 100 further includes a shaft member 156 that extends along the rotation axis 104 between a first end 158 and a second end 160. The shaft member 156 includes a shaft spline 162. The shaft spline 162 may be provided on outer surface adjacent to the first end 158 of the shaft member 156. The shaft member 156 is rotatably disposed on the input member 108 via a bearing 164. The second end 160 of the shaft member 156 may be drivably coupled with the transmission system of the vehicle.

Figure 2:
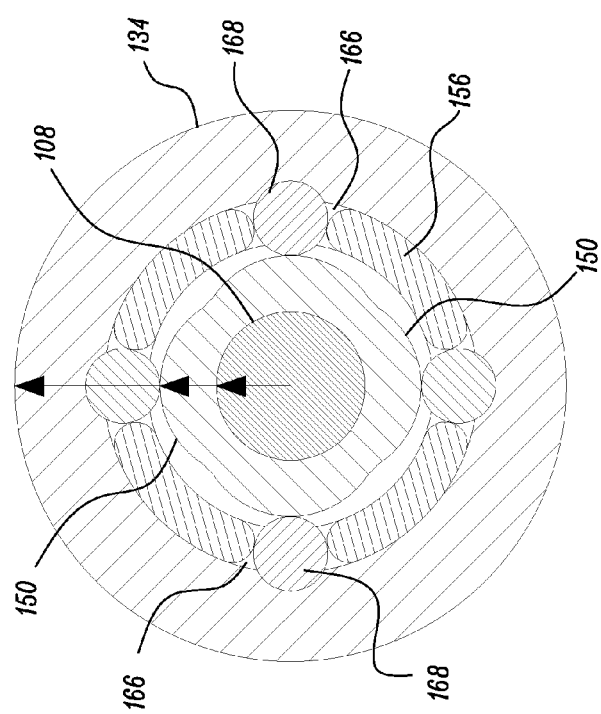
FIG. 2 is a cross sectional view of the clutch assembly taken along line A-A' of FIG. 1.

FIG. 2 shows a cross sectional view of the clutch assembly 100. In the embodiment of FIG. 2, the shaft member 156 further includes a plurality of slots 166. The plurality of slots 166 may extend radially through the shaft member 156. The plurality of the slots 166 may be equally spaced about the rotation axis 104. A plurality of balls 168 is at least partly received within the corresponding slots 166 of the shaft member 156. In the disengaged position of the actuator 120, the balls 168 are retained at least partly within the corresponding slot 166 by the inclined portion 134 of the hub member 126 against a centrifugal force created by rotation of the shaft member 156.

FIG. 3 is a sectional view of the clutch assembly 100 of FIG. 1 in a partially engaged condition thereof. The actuator 120 defines a chamber 170 with the basket member 106, the connecting member 110 and the input member 108. The chamber 170 receives a pressurized fluid from a fluid reservoir via a fluid pressurizing device, such as pump. A sealing member 172, such as oil seal, may be disposed on outer surface of the actuator 120. The sealing member 172 may abut the basket member 106 and the input member 108. The fluid reservoir may be located in the vehicle. Upon actuation of the fluid pressurizing device, the pressurized fluid may be discharged into the chamber 170 and pushes the actuator 120 such that the actuator 120 moves along the rotation axis 104 from the disengaged position thereof. However, in various other embodiments, the actuator 120 may be moved along the rotation axis by alternative drives, for example, a pneumatic drive, a mechanical drive, and so on.

Figure 4:
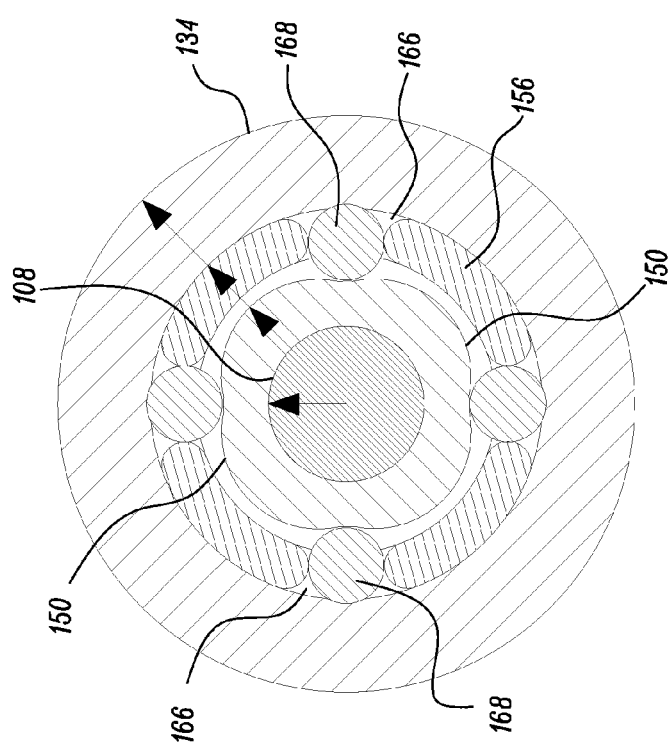
FIG. 4 is a cross sectional view of the clutch assembly taken along line A-A' of FIG. 3.

Referring to FIG. 4, as the actuator 120 moves towards the engaged position thereof, the inclined portion 134 of the hub member 126 moves the plurality of balls 168 to engage with the corresponding cam lobes 150. The plurality of balls 168 further rotates the cam member 142 in order to align the cam spline 152 with the shaft spline 162. As the hub member 126 moves further, the hub spline 132 engages with the shaft spline 162. In a fully engaged position of the balls 168 with the cam lobes 150, the cam member 142 locks with the shaft member 156, and thus aligns the hub spline 132 with the shaft spline 162.

Figure 5:
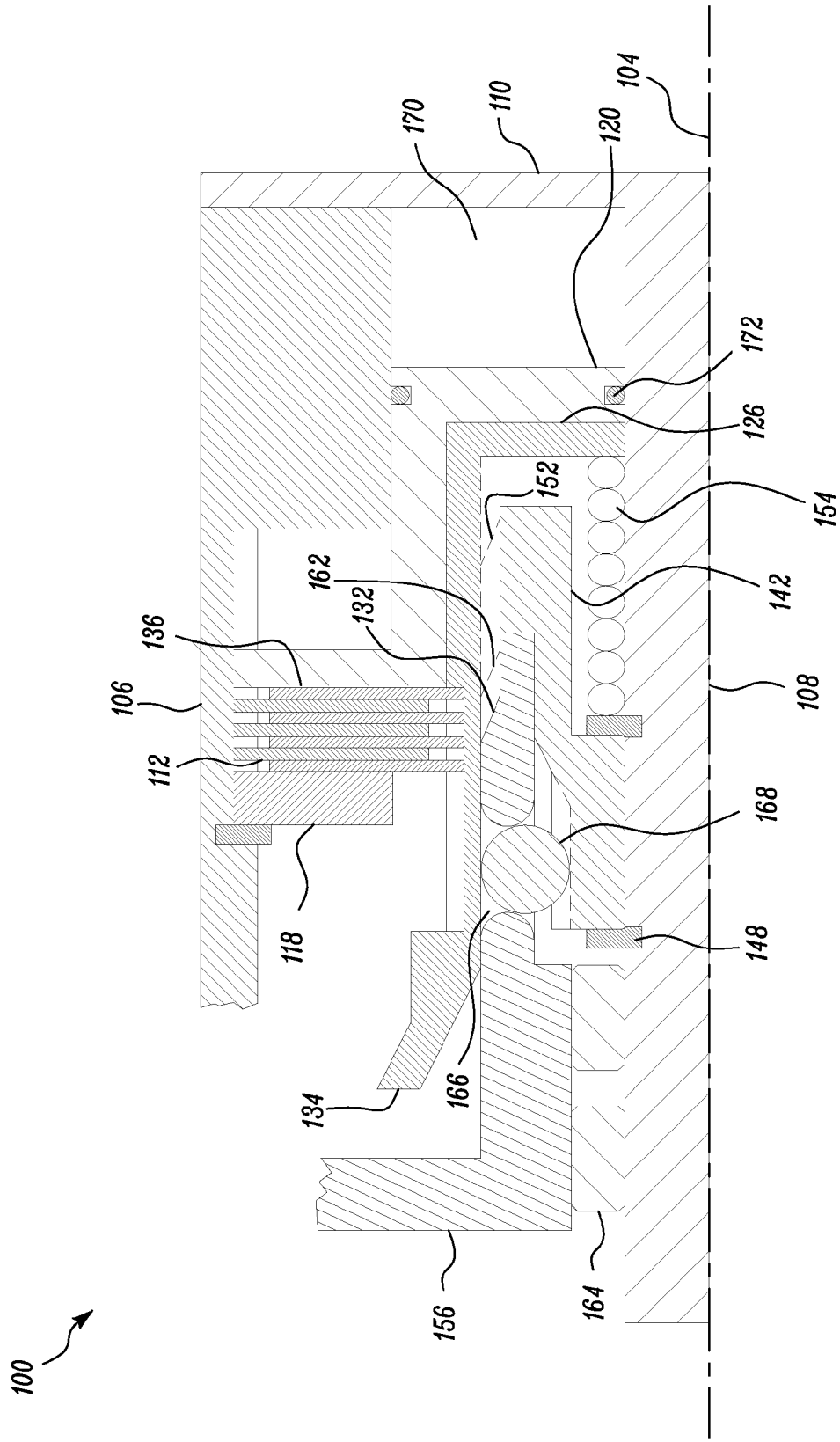
FIG. 5 is a partial sectional view of the clutch assembly of FIG. 1 in an engaged condition thereof.

FIG. 5 is a sectional view of the clutch assembly 100 of FIG. 1 in an engaged condition thereof. In the engaged condition of the clutch assembly 100, the actuator 120 moves to the engaged position thereof along the rotation axis 104 and pushes the first clutch plates 112 and the second clutch plates 136 towards the stopping member 118. Further, the hub member 126 moves relative to the cam member 142 and engages with the shaft member 156 when the hub spline 132 is aligned with the shaft spline 162. Thus, the hub member 126 engages with the basket member 106 to receive the power from the power source in the engaged position of the actuator 120. The hub member 126 further drives the shaft member 156 to transmit the power between the power source and the transmission system.

INDUSTRIAL APPLICABILITY

In an engaged condition of a multidisc clutch assembly, a plurality of first clutch plates and a plurality of second clutch plates engage with each other and transmit a power between a drive member and a driven member. In a disengaged condition of the clutch assembly, a relative rotation may exist between the first and second clutch plates. The relative rotation may lead to drag and/or spin losses within the clutch assembly The present disclosure relates to the clutch assembly 100. In the disengaged position of the actuator 120, the hub spline 132 and the shaft spline 162 are disengaged and misaligned. The second clutch plates 136 are disengaged from the first clutch plates 112. Further, the spring member 154 biases the hub member 126 along with the actuator 120 towards the disengaged position of the actuator 120. Hence, the shaft member 156 rotates freely on the input member 108 in the disengaged condition of the clutch assembly 100 and drag losses from the first and second clutches may not be transferred to the transmission system.

In the engaged condition of the clutch assembly 100, the actuator 120 moves towards the engaged position thereof along with the hub member 126. The inclined portion 134 of the hub member 126 moves the balls 168 to engage with the corresponding cam lobes 150. The balls 168 further rotate the cam member 142 in order to align the cam spline 152 with the shaft spline 162. As the hub member 126 moves further, the hub spline 132 engages with the shaft spline 162. The actuator 120 moves to the engaged position and pushes the first clutch plates 112 and the second clutch plates 136 towards the stopping member 118. Further, the hub member 126 engages with the shaft member 156 to transmit the power from the input member 108 to the shaft member 156 in the engaged position of the actuator 120.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A clutch assembly comprising:
   an input member extending along a rotation axis;
   a basket member rotatable about the rotation axis and spaced apart from the input member;
   a connecting member connecting the input member and the basket member;
   a plurality of first clutch plates slidably disposed on the basket member;
   an actuator disposed adjacent to the connecting member in a disengaged position thereof, the actuator being movable along the rotation axis between the disengaged position and an engaged position;
   a hub member disposed adjacent to the actuator, the hub member being configured with the actuator to move along the rotation axis to the engaged position, wherein the hub member includes a hub spline and an inclined portion;
   a spring member configured to bias the hub member and the actuator in the disengaged position;
   a plurality of second clutch plates slidably disposed on the hub member, wherein each of the plurality of second clutch plates are disengaged from the first clutch plates when the actuator is in the disengaged position, and wherein each of the plurality of second clutch plates are engaged with the adjoining first clutch plates when the actuator is moved to the engaged position;
   a cam member rotatably disposed on the input member, the cam member including a cam spline and a plurality of cam lobes, wherein the cam spline and the hub spline are engaged in the disengaged position of the actuator;
   a shaft member extending along the rotation axis, the shaft member including a shaft spline and a plurality of slots, the shaft member is rotatably disposed on the input member, the shaft spline being misaligned with the cam spline in the disengaged position of the actuator, wherein the shaft member is rotatable about the rotation axis relative to the cam member when the shaft spline and the cam spline are misaligned; and
   a plurality of balls at least partly received within the corresponding slots of the shaft member;
   wherein in the disengaged position of the actuator, the balls are retained at least partly within the corresponding slot by the inclined portion of the hub member against a centrifugal force, wherein the hub member is configured to move the plurality of balls to engage with the corresponding cam lobes due to movement along the rotation axis, wherein the plurality of balls rotate the cam member in order to align the cam spline with the shaft spline, and wherein the hub member is slidable relative to the cam member and the shaft member when the cam spline is aligned with the shaft spline.

\* \* \* \* \*